US012450907B2

(12) United States Patent
Zhu et al.

(10) Patent No.: US 12,450,907 B2
(45) Date of Patent: Oct. 21, 2025

(54) SMOKE DETECTION METHOD BASED ON DEEP LEARNING, DEVICE AND STORAGE MEDIUM

(71) Applicant: SHENZHEN UNIVERSITY, Guangdong (CN)

(72) Inventors: Yingying Zhu, Guangdong (CN); Junqi Zhao, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 435 days.

(21) Appl. No.: 18/110,903

(22) Filed: Feb. 17, 2023

(65) Prior Publication Data
US 2024/0037950 A1 Feb. 1, 2024

(30) Foreign Application Priority Data

Jul. 28, 2022 (CN) .......................... 202210901046.5

(51) Int. Cl.
G06V 20/52 (2022.01)
G06T 5/20 (2006.01)
(Continued)

(52) U.S. Cl.
CPC ............... *G06V 20/52* (2022.01); *G06T 5/20* (2013.01); *G06T 5/50* (2013.01); *G06T 7/174* (2017.01);
(Continued)

(58) Field of Classification Search
CPC .... G06V 20/52; G06V 10/26; G06V 10/7715; G06V 10/774; G06V 20/41;
(Continued)

(56) References Cited

U.S. PATENT DOCUMENTS

2019/0279478 A1* 9/2019 Ebata ..................... G06N 3/045

FOREIGN PATENT DOCUMENTS

| CN | 114169623 A | * | 3/2022 | |
| WO | WO-2021147257 A1 | * | 7/2021 | ............... G06N 3/08 |
| WO | WO-2022222569 A1 | * | 10/2022 | ......... G06K 9/00268 |

OTHER PUBLICATIONS

F.M. AnimHossain, Youmin M.Zhang, and Masuda AkterTonima. 2020. Forest fire flame and smoke detection from UAV-captured images using fire-specific color features and multi-color space local binary pattern. Journal of Unmanned Vehicle Systems. 8(4): 285-309. (Year: 2020).*

* cited by examiner

*Primary Examiner* — Amandeep Saini
*Assistant Examiner* — Andrew S Budisalich

(57) ABSTRACT

The present application relates to a smoke detection method based on deep learning, a device and a storage medium. The method includes the following steps: performing image enhancement processing and color transfer processing on a smoke image to obtain a color transferred smoke image; superimposing the color transferred smoke image on an indoor image to obtain an initial image, and performing screening processing, detection frame updating processing, feature extraction and layer calibration processing on the initial image to obtain a smoke calibrated feature image; performing segmentation processing, detection frame prediction processing, detection frame classification processing and image classification processing on the smoke calibrated feature image in sequence to obtain a smoke image set; and screening the smoke image set to obtain a target smoke image, and outputting a smoke detection result. The present disclosure realizes the collection of smoke data sets and improves the detection accuracy of smoke.

9 Claims, 4 Drawing Sheets

(51) Int. Cl.
*G06T 5/50* (2006.01)
*G06T 7/11* (2017.01)
*G06T 7/174* (2017.01)
*G06T 7/90* (2017.01)
*G06V 10/26* (2022.01)
*G06V 10/56* (2022.01)
*G06V 10/77* (2022.01)
*G06V 10/774* (2022.01)
*G06V 10/82* (2022.01)
*G06V 20/40* (2022.01)

(52) U.S. Cl.
CPC .......... *G06V 10/26* (2022.01); *G06V 10/7715* (2022.01); *G06V 10/774* (2022.01); *G06V 20/41* (2022.01); *G06T 2207/10016* (2013.01); *G06T 2207/10024* (2013.01); *G06T 2207/20021* (2013.01); *G06T 2207/20081* (2013.01); *G06T 2207/20224* (2013.01)

(58) Field of Classification Search
CPC .... G06V 2201/07; G06V 10/56; G06V 10/82; G06V 10/20; G06V 10/25; G06V 10/40; G06V 10/764; G06V 20/40; G06T 5/20; G06T 5/50; G06T 7/174; G06T 2207/10016; G06T 2207/10024; G06T 2207/20021; G06T 2207/20081; G06T 2207/20224; G06T 7/11; G06T 7/90; G06T 2207/20016; G06T 2207/20076; G06T 2207/20084; G06T 2207/30232; G06T 7/70; G06T 2207/20221; G06N 3/08

See application file for complete search history.

SMOKE DETECTION METHOD BASED ON DEEP LEARNING, DEVICE AND STORAGE MEDIUM

CROSS REFERENCE TO RELATED APPLICATIONS

The present application claims the benefit of Chinese Patent Application No. 202210901046.5 filed on Jul. 28, 2022, the contents of which are incorporated herein by reference in their entirety.

TECHNICAL FIELD

The present application relates to the technical field of artificial intelligence, and in particular to a smoke detection method based on deep learning, a device and a storage medium.

BACKGROUND

Traditional smoke detection methods are mostly based on the detection technology of physical sensors, including ionic smoke sensors, gas-sensitive smoke sensors, photoelectric smoke sensors and the like, but the smoke sensors are not suitable for environments with high sensitivity requirements, complexity and diversity, and relatively large ranges. If smoke detection is solved by a visual method, the response speed, detection range will be guaranteed, and the installation cost will be low. The traditional visual method of smoke detection focuses on learning the color and texture features of smoke for smoke detection. Smoke detection is performed through low-level features of smoke, including colors, textures, moving directions and the like. There are two problems with most of these algorithms. Firstly, the robustness is relatively poor. These different methods can achieve good performance in specific image data sets, but the performance is often relatively poor in different image data sets. Therefore, it is difficult for these methods to eliminate complex interference in practical engineering applications. Secondly, only large pieces of nearby smoke can be detected, and the detection accuracy is limited for smoke newly generated or smoke generated from relatively long distances.

Due to the disadvantages of traditional smoke detection methods, the smoke detection method based on deep learning has become a research hotspot at home and abroad. However, it still needs to solve two difficulties for applying deep learning to smoke detection. The first difficulty is the acquisition of data sets as there are potential safety hazards for indoor discharge of fireworks. For flammable and explosive units and all no-smoking areas, it is necessary to clean up the potential safety hazards before obtaining smoke data, which makes it difficult to obtain data. Secondly, the self-similarity and transparency of smoke lead to unfixed shapes of smoke. The spread of smoke will lead to multiple smoke targets in a smoke scene, which is not conducive to the network learning smoke features, thus resulting in high false alarm rate. There is an urgent need for a method that can collect smoke data sets and improve the detection accuracy of smoke.

SUMMARY

The embodiments of the present application are aimed at providing a smoke detection method based on deep learning, a device and a storage medium to realize the collection of smoke data sets and improve the detection accuracy of smoke.

To solve the above technical problems, the embodiment of the present application provides a smoke detection method based on deep learning, which includes the following steps:

acquiring a smoke image and an indoor image, wherein the smoke image includes image transparency;

determining a size and a position relationship of the smoke image in the indoor image, and performing image enhancement processing on the smoke image based on the size and the position relationship of the smoke image in the indoor image to obtain a basic smoke image;

acquiring an illumination image of an indoor scene at a corresponding position of the basic smoke image, and performing color transfer processing on the basic smoke image based on the illumination image to obtain a color transferred smoke image;

superimposing the color transferred smoke image on the indoor image based on the smoke transparency to obtain an initial image, and performing screening processing and detection frame updating processing on the initial image to obtain a target image;

performing feature extraction on the target image through a multilayered network to obtain a smoke feature image, and performing layer calibration processing on the smoke feature image to obtain a smoke calibrated feature image;

performing segmentation processing, detection frame prediction processing, detection frame classification processing and image classification processing on the smoke calibrated feature image in sequence according to a step-by-step feature learning mode to obtain a smoke image set, wherein the smoke image set includes confidence degrees and union-intersection parameters of smoke features; and screening the smoke image set based on the confidence degrees and the union-intersection parameters of the smoke features to obtain a target smoke image, and outputting a smoke detection result based on the target smoke image.

To solve the above technical problems, one technical solution adopted by the present disclosure is as follows: a computer device is provided, and the computer device includes a memory and a processor; the memory stores a computer program therein; and the processor executes the computer program to implement any one of the above-mentioned smoke detection methods based on deep learning.

To solve the above technical problems, one technical solution adopted by the present disclosure is as follows: a computer readable storage medium is provided, and the computer readable storage medium stores a computer program thereon; and the processor executes the computer program to implement any one of the above-mentioned smoke detection methods based on deep learning.

The embodiments of the present disclosure provide the smoke detection method based on deep learning, the device and the storage medium. According to the embodiment of the present disclosure, the smoke image and the indoor image are generated, the size and the position relationship of the smoke image in the indoor image are determined, then image enhancement processing and color transfer processing are performed on the smoke image, and the smoke image is superimposed on the indoor image, so that the problem that the smoke data sets are difficult to obtain is solved; at the same time, according to the present application, feature extraction and layer calibration processing are further performed on the target image to generate the smoke calibrated feature image, and segmentation processing, detection frame prediction processing, detection frame classification processing and image classification processing are performed on the smoke calibrated feature image in sequence, so that the problem that the local features and global features of smoke overlap due to the self-similarity of the smoke image, and the problem that smoke is easily mixed with background features due to the transparency of smoke itself are solved, and thus, the detection accuracy of smoke is improved.

BRIEF DESCRIPTION OF THE DRAWINGS

To describe the technical solutions of the present application more clearly, the following briefly introduces the accompanying drawings required for describing the embodiments of the present application. Apparently, the accompanying drawings in the following description show only some embodiments of the present application, and a person of ordinary skill in the art may still derive other drawings from these accompanying drawings without creative efforts.

DETAILED DESCRIPTION

A smoke detection method based on deep learning provided by the embodiment of the present application is generally executed by a server, and accordingly, a smoke detection apparatus based on deep learning is generally configured in the server.

Figure 1:
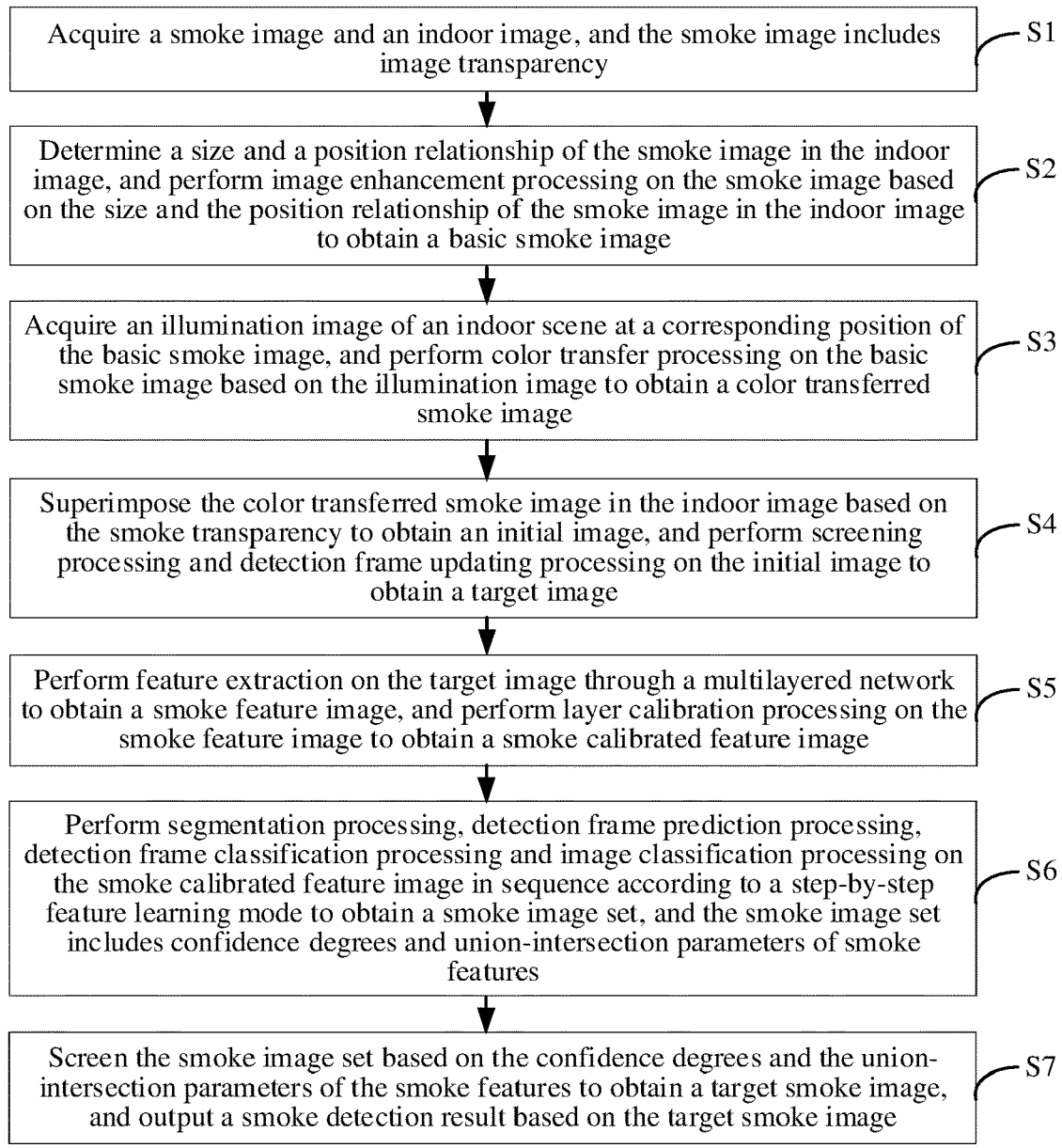
FIG. 1 is an implementation flow chart of a smoke detection method based on deep learning provided by an embodiment of the present application.

Referring to FIG. 1, FIG. 1 shows a specific implementation mode of the smoke detection method based on deep learning.

It should be noted that if there are substantially the same results, the method of the present disclosure is not limited to the flow sequence shown in FIG. 1, and the method includes the following steps:

S1: a smoke image and an indoor image are acquired, and the smoke image includes image transparency.

Specifically, a smoke detection frame is generated by generating smoke, acquiring a smoke video, and then labeling the smoke video. Then, by simulating smoke data, the smoke image of the smoke data is obtained from different angles, and the indoor image corresponding to the smoke is generated.

Figure 2:
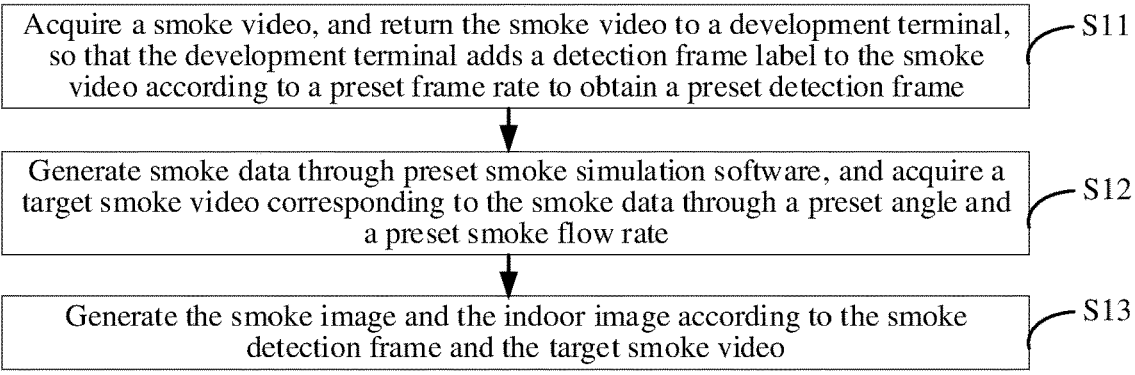
FIG. 2 is another implementation flow chart of a sub-process of a smoke detection method based on deep learning provided by an embodiment of the present application.

Referring to FIG. 2, FIG. 2 shows a specific implementation of S1, which is described as below:

S11: a smoke video is acquired, and the smoke video is returned to a development terminal, so that the development terminal adds a detection frame label to the smoke video according to a preset frame rate to obtain a smoke detection frame.

Specifically, a smoke generator is used for generating smoke, and the smoke video is obtained from a surveillance camera and a mobile phone camera. The smoke video includes a whole process from appearance of smoke to spreading of smoke to a whole indoor scene. Then the smoke video is returned to the development terminal, and the development terminal adds the detection frame label to the smoke video according to the preset frame rate to obtain the smoke detection frame. As the smoke video is continuous, two image detection frames before and after indicating smoke labeling should also have continuity. The preset frame rate is set according to the actual situation and is not limited herein. In a specific embodiment, the smoke video is labeled at the frame rate of average 6 frames per second.

S12: smoke data is generated through preset smoke simulation software, and a target smoke video corresponding to the smoke data is acquired through a preset angle and a preset smoke flow rate.

S13: the smoke image and the indoor image are generated according to the smoke detection frame and the target smoke video.

Specifically, the preset smoke simulation software of the embodiment of the present application is Blender. Through the smoke simulation software, smoke is emitted into a domain by a particle simulation system, and the smoke movement is controlled by airflow in the domain. In order to increase diversity, an initial flow rate and airflow are randomly set, and viewing angles include looking up, looking at the front horizontally and looking down. Considering that the use scenes of the embodiment of the present application are mostly indoor monitoring scenes, illumination sources are all from above the smoke. Through such simulation, multiple synthetic smoke images and corresponding indoor images are obtained. The smoke images are obtained by the particle system. Each smoke image is a 256×256 pixel image containing only smoke. Each smoke image has four channels, three of which are colors RGB, and the last one of which represents smoke transparency. The smoke image is a pure smoke image that does not contain background. The indoor image is used for participating in image synthesis of another indoor image, and in addition, the indoor image itself may contain smoke data.

S2: a size and a position relationship of the smoke image in the indoor image are determined, and image enhancement processing is performed on the smoke image based on the size and the position relationship of the smoke image in the indoor image to obtain a basic smoke image.

Figure 3:
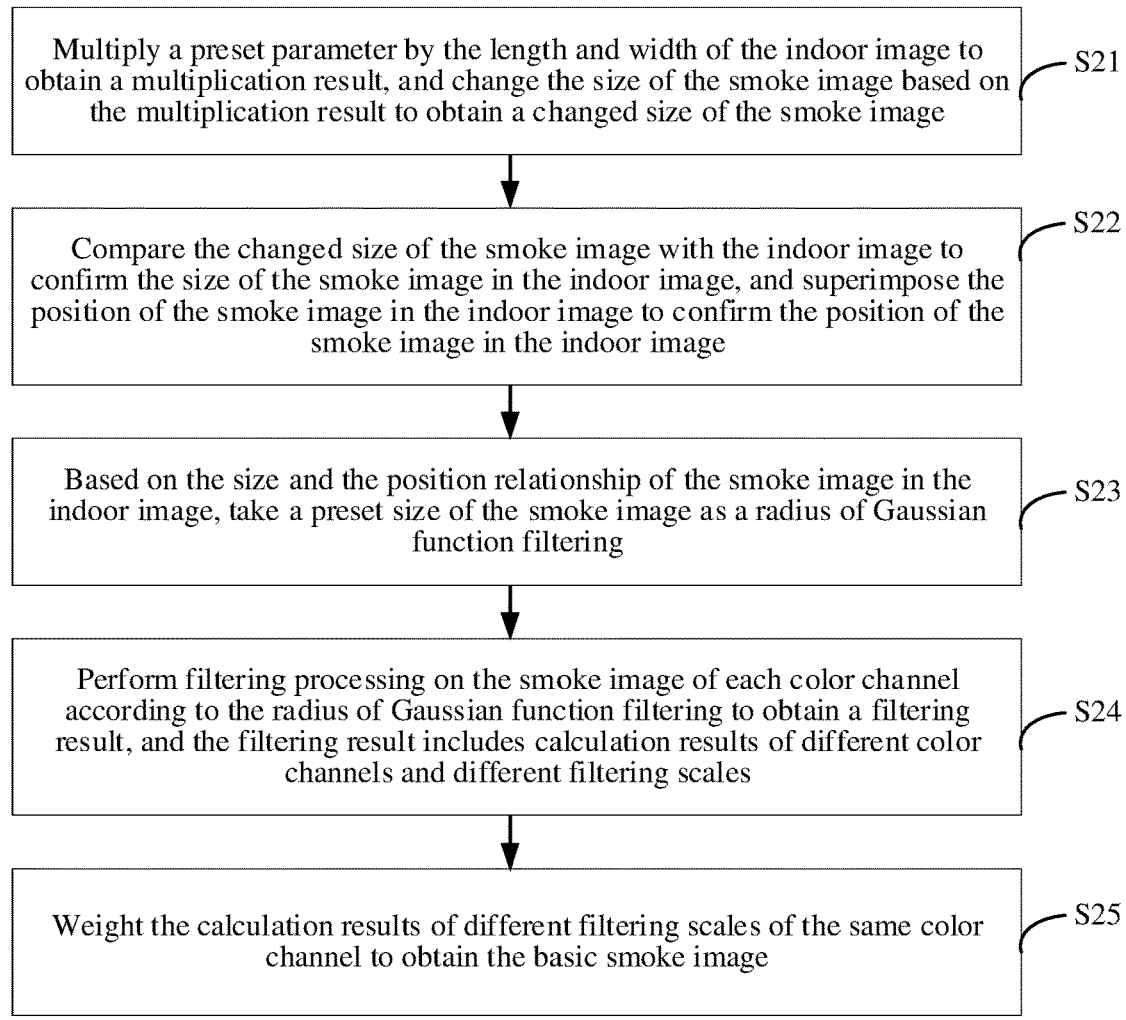
FIG. 3 is another implementation flow chart of a sub-process of a smoke detection method based on deep learning provided by an embodiment of the present application.

Referring to FIG. 3, FIG. 3 shows a specific implementation of S2, which is described as below:

S21: a preset parameter is multiplied by the length and width of the indoor image to obtain a multiplication result, and the size of the smoke image is changed based on the multiplication result to obtain a changed size of the smoke image.

S22: the changed size of the smoke image is compared with the indoor image to confirm the size of the smoke image in the indoor image, and the position of the smoke image in the indoor image is superimposed to confirm the position of the smoke image in the indoor image.

Specifically, the preset parameter is multiplied by the length and width of the indoor image to obtain the multiplication result, and the size of the smoke image is changed to obtain the changed size of the smoke image. For example, [0.1,0.2,0.3,0.4,0.5] are respectively multiplied by the length and width of the indoor image to obtain an array with a length of 10, a number is randomly selected from the array as the length and width of the smoke image, and then the size of the smoke image is changed to make the length and width of the smoke image equal to the selected number. Then, the length-width ratio is limited to a range of 0.5 to 1.5 through truncated normal distribution, and the mean value is 1.0. The variance can be changed according to actual situations, and the variance selected in the embodiment of the present application is 1.0. The size of the smoke image is changed again according to the selected length-width ratio. Then, whether the length and width of the smoke image are smaller than the length and width of the indoor image is determined to ensure that the smoke image can be completely stored in the indoor image. If the indoor image cannot completely store the smoke image, the size of the smoke image is selected again, thereby confirming the size of the smoke image in the indoor image to ensure that the smoke image can be completely stored in the indoor image. Finally, a position for the superimposition of the smoke image is selected on the indoor image to ensure that the smoke image will not overlap with smoke in the indoor image, and the smoke image will not exceed the scope of the indoor image, thereby confirming the position of the smoke image in the indoor image. The method selected in the embodiment of the present application is to locate the upper left corner of an overlapping position.

S23: based on the size and the position relationship of the smoke image in the indoor image, a preset size of the smoke image is taken as a radius of Gaussian function filtering.

S24: filtering processing is performed on the smoke image of each color channel according to the radius of Gaussian function filtering to obtain a filtering result, and the filtering result includes calculation results of different color channels and different filtering scales.

S25: the calculation results of different filtering scales of the same color channel are weighted to obtain the basic smoke image.

Specifically, after the size and the position relationship of the smoke image in the indoor image are determined, it is necessary to perform image enhancement processing on the smoke image. The preset size of the smoke image is set according to actual situations and is not limited herein. In one specific embodiment, the preset size of the smoke image is 0.01, 0.05, and 0.1. Then filtering processing is performed on the smoke image of each color channel according to the radius of Gaussian function filtering to obtain the filtering result, and the filtering result includes the calculation results of different color channels and different filtering scales. The calculation results of different filtering scales of the same color channel are weighted to obtain the basic smoke image. The filtering processing includes an SSR (Signal Scale Retinex) algorithm and an MSR (Multi-Scale Retinex) algorithm. The Gaussian function F(x,y) in the SSR algorithm is:

$$F(x, y) = \lambda \exp\left(\frac{-(x^2 + y^2)}{c^2}\right),$$

x, y represents the position of a pixel in the smoke image; c represents Gaussian surrounding scale, λ represents normalized scale, and ∬ F(x,y)dxdy=1 is ensured.

The SSR algorithm can be specifically expressed as:

$$\log R(x, y) = \log \frac{S(x, y)}{L(x, y)} = \log S(x, y) - \log L(x, y) = \log S(x, y) - \log[F(x, y) * S(x, y)];$$

S(x,y) represents color information of an original image, L(x,y) represents brightness information of the original image, and F(x,y) represents corresponding Gaussian filtering function.

The MSR algorithm is expressed as:

$$R_{MSR_i} = \sum_{n=1}^{N} \omega_n R_{n_i} = \sum_{n=1}^{N} \omega_n \{\log S_i(x, y) - \log[F_n(x, y) * S_i(x, y)]\}$$

S(x,y) represents color information of the original image, L(x,y) represents brightness information of the original image, i represents different color channels, N represents the number of scales, ω represents weights of different scales, and 1/N is selected in this embodiment.

S3: an illumination image of an indoor scene at a corresponding position of the basic smoke image is acquired, and color transfer processing is performed on the basic smoke image based on the illumination image to obtain a color transferred smoke image.

Specifically, in order to avoid the color difference between the basic smoke image and the indoor image, color transfer processing is performed on the basic smoke image to obtain the color transferred smoke image.

Figure 4:
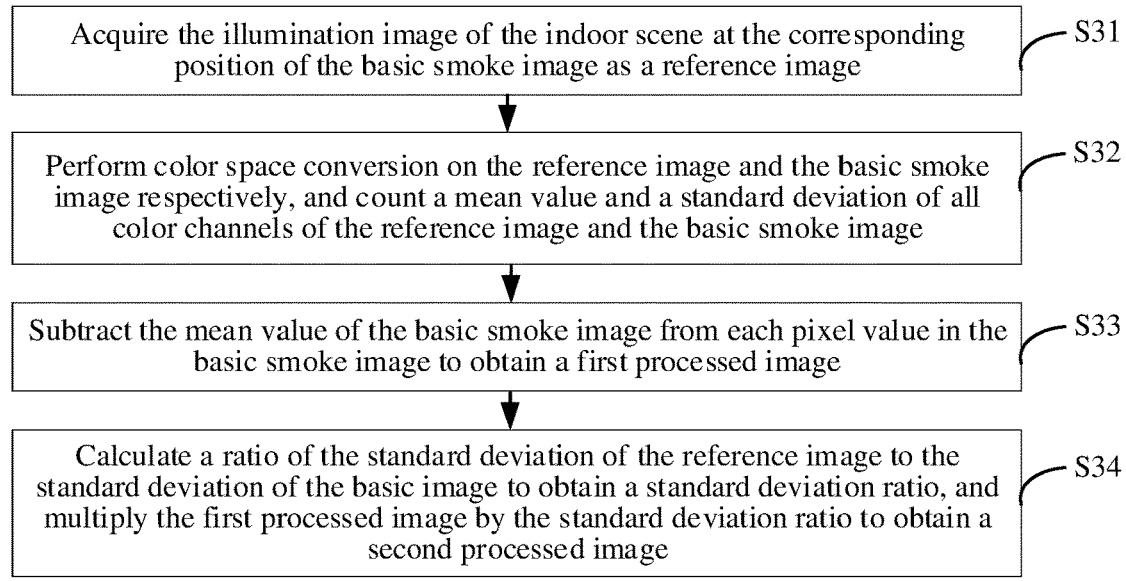
FIG. 4 is another implementation flow chart of a sub-process of a smoke detection method based on deep learning provided by an embodiment of the present application.

Referring to FIG. 4, FIG. 4 shows a specific implementation of S3, which is described as below:

S31: the illumination image of the indoor scene at the corresponding position of the basic smoke image is acquired as a reference image.

S32: color space conversion is performed on the reference image and the basic smoke image respectively, and a mean value and a standard deviation of all color channels of the reference image and the basic smoke image are counted.

S33: the mean value of the basic smoke image is subtracted from each pixel value in the basic smoke image to obtain a first processed image.

S34: a ratio of the standard deviation of the reference image to the standard deviation of the basic smoke image is calculated to obtain a standard deviation ratio, and the first processed image is multiplied by the standard deviation ratio to obtain a second processed image.

S34: a mean value of the second processed image and the mean value of the reference image is added to obtain the color transferred smoke image.

Specifically, as the above steps have determined the size and the position relationship of the smoke image in the indoor image, the illumination image of the indoor scene at the corresponding position of the basic smoke image is acquired as the reference image.

Then the reference image and the basic smoke image are respectively subjected to color space conversion, and the conversion process is as follows: firstly, an RGB color space is converted to an LAB color space, L represents the brightness, A represents the component from green to red, and B represents the component from blue to yellow; then the mean value and the standard deviation of all color channels of the reference image and the basic smoke image are counted, and the mean value of the basic smoke image is subtracted from each pixel value in the basic smoke image to obtain the first processed image; the ratio of the standard deviation of the reference image to the standard deviation of the basic smoke image is calculated to obtain the standard deviation ratio; the first processed image is multiplied by the standard deviation ratio to obtain the second processed image; and finally, the mean value of the second processed image and the mean value of the reference image are added to obtain the color transferred smoke image. The color transfer processing of the color transferred smoke image is expressed by the formula as follows:

$$l_k = \frac{\delta_t^k}{\delta_s^k}(S^k - \text{mean}(S^k)) + \text{mean}(T^k), k = l, a, b;$$

S represents the basic smoke image, T represents the reference image, k represents the color channel, δ represents the variance, mean represents the mean value, and $l_k$ represents the brightness.

S4: the color transferred smoke image is superimposed on the indoor image based on the smoke transparency to obtain an initial image, and screening processing and detection frame updating processing are performed on the initial image to obtain a target image.

Specifically, as not all parts of the color transferred smoke image contain smoke data, after the color transferred smoke image is superimposed in the indoor image, screening processing and detection frame updating processing are performed on the initial image to obtain the target image.

Figure 5:
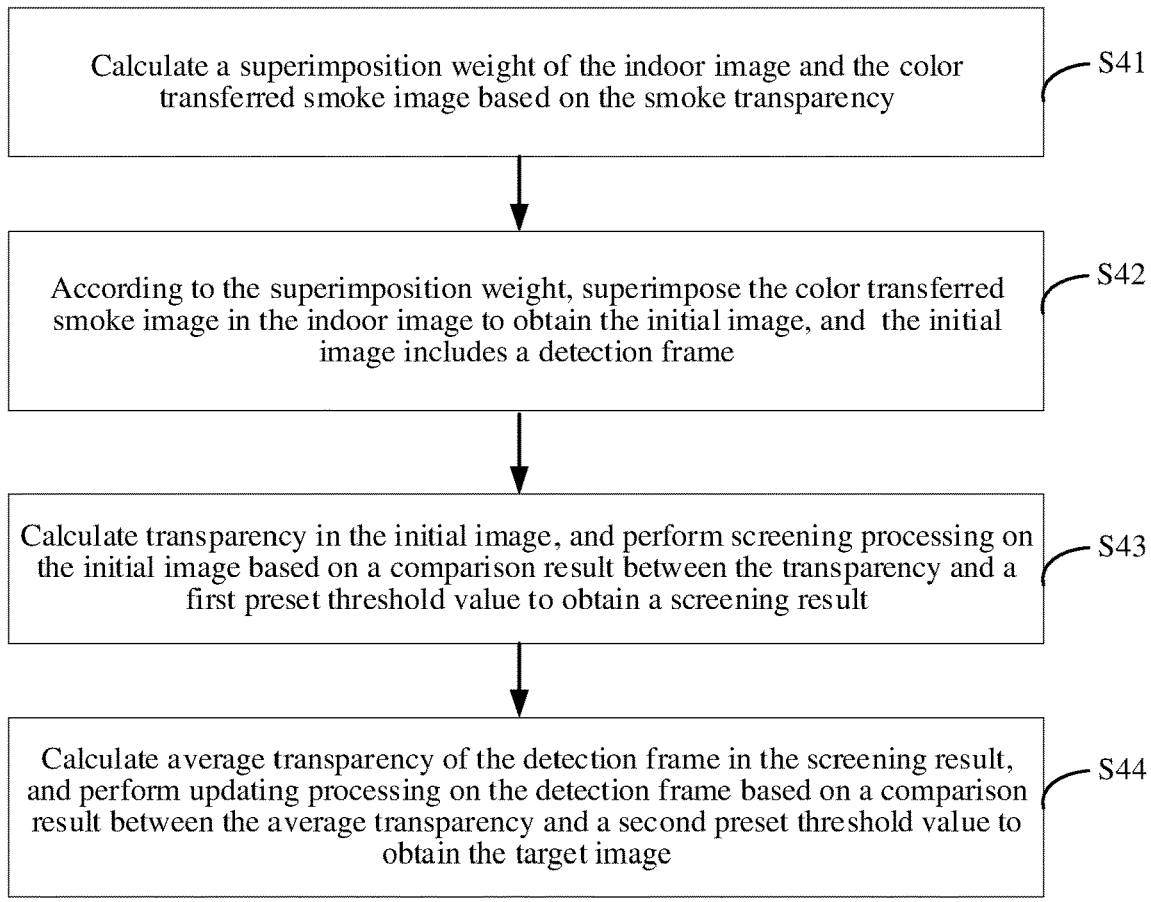
FIG. 5 is another implementation flow chart of a sub-process of a smoke detection method based on deep learning provided by an embodiment of the present application.

Referring to FIG. 5, FIG. 5 shows a specific implementation of S4, which is described as S41: a superimposition weight of the indoor image and the color transferred smoke image is calculated based on the smoke transparency.

S42: according to the superimposition weight, the color transferred smoke image is superimposed in the indoor image to obtain the initial image, and the initial image includes a detection frame.

S43: transparency in the initial image is calculated, and screening processing is performed on the initial image based on a comparison result between the transparency and a first preset threshold value to obtain a screening result.

S44: average transparency of the detection frame in the screening result is calculated, and updating processing is performed on the detection frame based on a comparison result between the average transparency and a second preset threshold value to obtain the target image.

Specifically, the superimposition weight of the indoor image and the color transferred smoke image is calculated based on the smoke transparency, and the calculation formula of the superimposition weight is as follows:

$$I_k(x,y) = (1 - \omega(x,y))I_k(x,y) + \omega(x,y)S_k(x,y), k = R, G, B;$$

ω(x,y) represents the weight of different scales, $S_k(x,y)$ represents the basic smoke image, k represents the color channel, $l_k(x,y)$ represents the brightness, and $l_k(x,y)$ represents the smoke transparency.

Specifically, according to the superimposition weight, the color transferred smoke image is superimposed in the indoor image to obtain the initial image, the initial image includes the detection frame, and then the transparency in the initial image is calculated; based on the comparison result between the transparency and the first preset threshold value, the initial image is screened to obtain the screening result; the average transparency of the detection frame in the screening result is calculated; and based on the comparison result between the average transparency and the second preset threshold value, the detection frame is updated to obtain the target image. The method for screening the initial image in the embodiment of the present application includes the following steps: the maximum transparency of each row of the initial image is calculated from top to bottom, and if the transparency reaches 0.5 (the first preset threshold value), the row is recorded and the traversal is stopped; then the same method is adopted to record the maximum transparency of each row and each column from bottom to top, from left to right, and from right to left respectively in sequence, if the maximum transparency is greater than or equal to 0.5, it will be regarded as the screening result, and the traversal is stopped; and the rows and the columns obtained at this time will be called an upper row, a lower row, a left column and a right column respectively.

Further, the updating process of the detection frame in the present application is as follows: the generated detection frames are adjusted in sequence with an adjustment order of the lower row, the right column, the left column and the upper row. Taking the upper row as an example, whether the average transparency corresponding to the upper row of the detection frame reaches 0.1 (the second preset threshold value) is calculated. If not, the position corresponding to the upper row of the detection frame is moved down until the condition is met. As smoke moves from bottom to top, the adjustment order of the lower row, the right column, the left column, and the upper row is selected. For a cloud of smoke, the concentration at the bottom is generally dense, and therefore, generally as long as the lower part of the marked detection frame is only slightly adjusted, the requirements can be met. As smoke gradually spreads, the upper part is adjusted after other directions are determined. It can be easily concluded that the adjustment of the left column and the right column is only affected by the upper row and the lower row, therefore, the left column and the right column are moved after the lower row and before the upper row, and the order of the two columns does not affect the result. When the lower row, the right column, the left column and the upper row in the initial image are all adjusted, a smoke calibrated feature image is obtained.

S5: feature extraction is performed on the target image through a multilayered network to obtain a smoke feature image, and layer calibration processing is performed on the smoke feature image to obtain a smoke calibrated feature image.

Specifically, before step S5, after the target image is acquired, a data enhancement operation is performed on the target image. The data enhancement operation includes Expand (scaling the image in unequal proportions), MinIoURandomCrop (random cropping, but the cropping frame and the true value are required to reach a certain IOU), random overturning and change of brightness and contrast of the image. Feature extraction is performed through the multilayered network to obtain a smoke feature image, and layer calibration processing is performed on the smoke feature image to obtain the smoke calibrated feature image.

Figure 6:
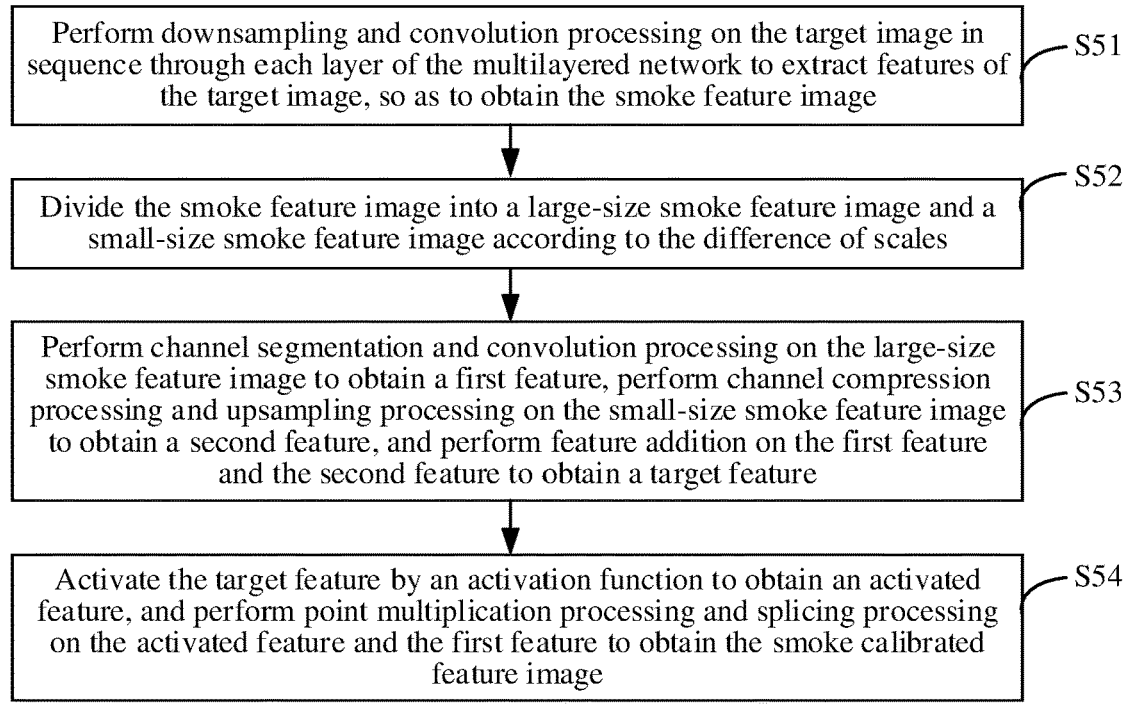
FIG. 6 is another implementation flow chart of a sub-process of a smoke detection method based on deep learning provided by an embodiment of the present application.

Referring to FIG. 6, FIG. 6 shows a specific implementation of S5, which is described as S51: downsampling and convolution processing are performed on the target image in sequence through each layer of the multilayered network to extract features of the target image, so as to obtain the smoke feature image.

Specifically, the multilayer network is a backbone network composed of C1 to C5. When the target image is input into C1 layer network, an output size of the target image is the same as an input size of the target image. When the target image is input into C2 layer network, an output size of the target image is reduced by half as compared with an input size of the target image. When the target image is input into C3 layer network, an output size of the target image is reduced again by half as compared with an input size of the target image. Similarly, when the target image is input into C4 layer network and C5 layer network, an output size of the target image is reduced by half in sequence. Then through downsampling and one convolution operation with the convolution kernel size of 1×1 and the same channel, feature extraction is performed on the target image to obtain the smoke feature image, and the smoke feature images are images of different scales. Then layer calibration is performed between every two adjacent layers of networks to extract features respectively. If the number of layers of features required to be output exceeds four, a method of continuing downsampling the highest layer is adopted.

S52: the smoke feature image is divided into a large-size smoke feature image and a small-size smoke feature image according to the difference of scales.

S53: channel segmentation and convolution processing are performed on the large-size smoke feature image to obtain a first feature, channel compression processing and upsampling processing are performed on the small-size smoke feature image to obtain a second feature, and feature addition is performed on the first feature and the second feature to obtain a target feature.

S54: the target feature is activated by an activation function to obtain an activated feature, and point multiplication processing and splicing processing are performed on the activated feature and the first feature to obtain the smoke calibrated feature image.

Specifically, long-distance dependency is constructed by layer calibration operation to replace basic convolution transformation, thereby helping convolution network learn effective discriminant representation. The method has two advantages. The first advantage is that the method can adaptively encode long-distance information for each spatial position, and is not limited to convolutions in small regions. The second advantage is that operations can dynamically adjust the attention of the network to different layers, restrain layers that cannot participate in the prediction, and pay attention to layers that are more likely to predict the results. Firstly, according to the difference of scales, the smoke feature image is divided into the large-scale smoke feature image and the small-scale smoke feature image. The large-scale smoke feature image is subjected to channel segmentation and convolution processing to obtain the first feature. The small-scale smoke feature image is subjected to channel compression processing and upsampling processing to obtain the second feature. The first feature and the second feature are added to obtain the target feature. The target feature is activated by an activation function to obtain an activated feature, and point multiplication processing and splicing processing are performed on the activated feature and the first feature to obtain the smoke calibrated feature image.

S6: segmentation processing, detection frame prediction processing, detection frame classification processing and image classification processing are performed on the smoke calibrated feature image in sequence according to a step-by-step feature learning mode to obtain a smoke image set, and the smoke image set includes confidence degrees and union-intersection parameters of smoke features.

Specifically, the step-by-step feature learning mode refers to splicing the last layer of feature of the previous processing task result into the feature of a next processing task so as to assist the prediction of the next processing task.

Figure 7:
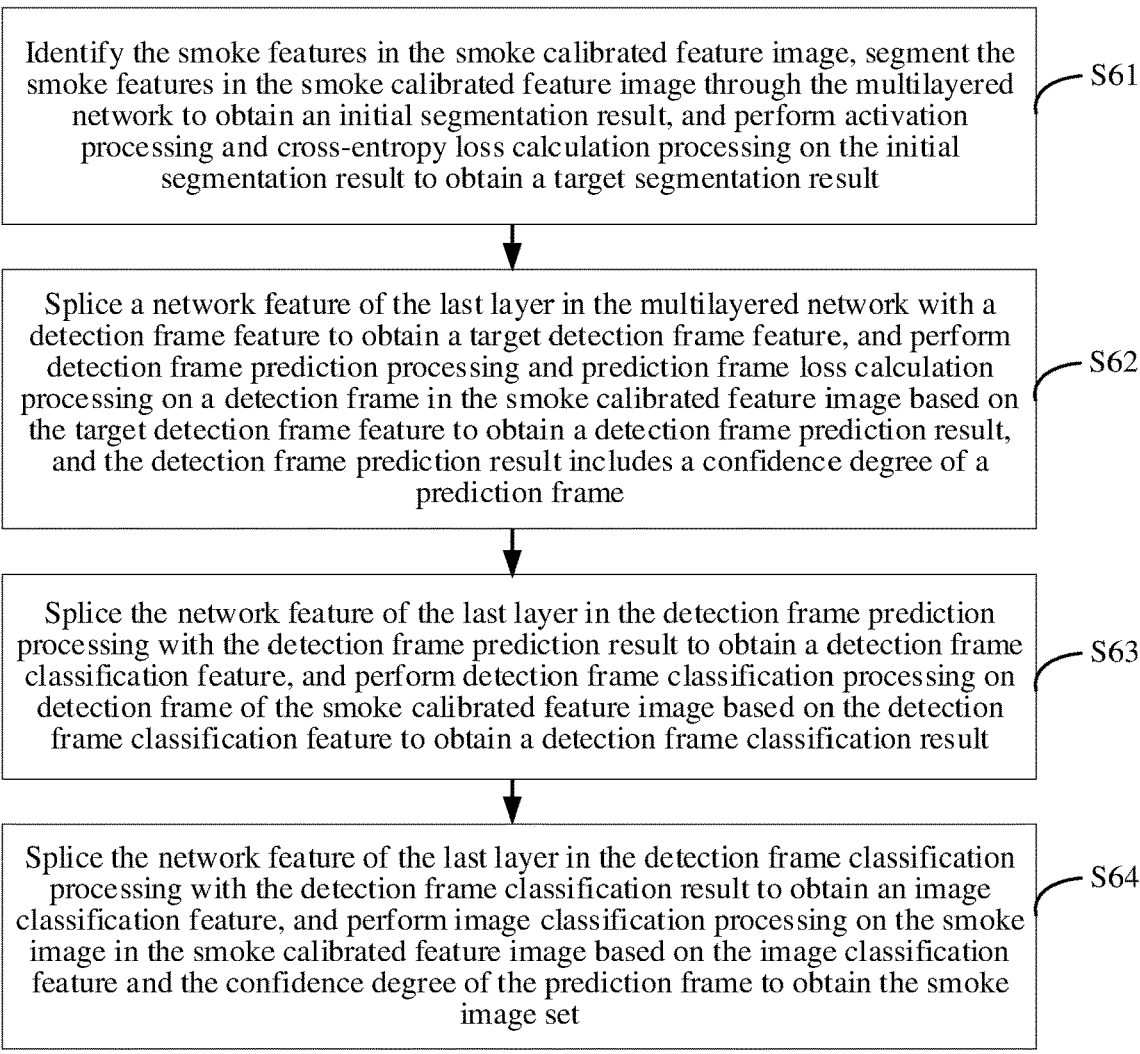
FIG. 7 is another implementation flow chart of a sub-process of a smoke detection method based on deep learning provided by an embodiment of the present application.

Referring to FIG. 7, FIG. 7 shows a specific implementation of S6, which is described as below:

S61: the smoke features in the smoke calibrated feature image are identified, the smoke features in the smoke calibrated feature image is segmented through the multilayered network to obtain an initial segmentation result, and activation processing and cross-entropy loss calculation processing are performed on the initial segmentation result to obtain a target segmentation result.

Specifically, Segmentation processing is aimed to segment the smoke features in the smoke calibrated feature image, that is, to segment smoke image areas corresponding to the smoke features. The biggest feature of the segmentation task is that there is no label, or labels used are synthetic labels. The labels refer to the smoke features in the smoke calibrated feature image. For tasks without labels, detection frames and a Gaussian function are used as labels. The synthetic label is a label produced when the color transferred smoke image is superimposed in the indoor image in the above step, and the transparency of the label is used as the smoke feature. It is worth noting that the label size can exceed the detection frame of the initial image at this time. For each layer of feature, three 1×1 convolutions are respectively used for feature compression, output results are compressed to channel=1, and subjected to Relu activation function, finally the cross entropy loss is calculated, and thus, the target segmentation result is obtained. Another point worth noting is that different layers are predicted separately, and a grid used for each layer prediction is limited by the size of feature.

S62: a network feature of the last layer in the multilayered network is spliced with a detection frame feature to obtain a target detection frame feature, and detection frame prediction processing and prediction frame loss calculation processing are performed on a detection frame in the smoke calibrated feature image based on the target detection frame feature to obtain a detection frame prediction result, and the detection frame prediction result includes a confidence degree of a prediction frame.

Specifically, multiple frames are involved in the detection frame prediction process, which are respectively preset frames: frames specified in advance, each layer of frames have different sizes, and meanwhile each layer has a plurality of preset frames with different length-width ratios; prediction frames: frames obtained after fine-tuning the preset frames according to an output result of the network; truth value frames: actual corresponding truth value frames on the smoke image; detection frames: prediction frames for predicting a final output result of the network, the prediction result of the detection frames includes confidence degrees of the prediction frames; and as these prediction frames are used as the final detection frames, the confidence degrees of these prediction frames are all true.

In the embodiment of the present application, the last layer of network feature used for segmentation through the multilayered network is spliced with the detection frame feature to obtain the target detection frame feature, then random sampling is adopted, and the grid nearest to the center of the detection frame in the target detection frame feature is selected to predict the true value. In order to help the network learn what kind of smoke should be predicted by which layer of the network, the embodiment of the present application sets three preset frames with different length-width ratios but the same area for each layer, and the length-width ratios used for the preset frames are respectively 0.5, 1.0 and 2.0. When the used length-width ratio is 1.0, side lengths of the corresponding preset frames are 32, 64, 128, 256 and 512 respectively. Each preset frame is fine-tuned by using the prediction result to obtain the prediction result. Only the preset frames, of which the IOU (intersection over union) between the preset frame and the true value of is greater than 0.7 or which are completely surrounded by smoke labels, are allowed to participate in the fine-tuning of the prediction frames, thereby realizing the prediction processing of the detection frames and obtaining an initial prediction result of the detection frames. Then prediction frame loss calculation processing is performed, which refers to calculating the loss of prediction center point and the length and width of the prediction frame by using cross entropy.

S63: the network feature of the last layer in the detection frame prediction processing is spliced with the detection frame prediction result to obtain a detection frame classification feature, and detection frame classification processing is performed on the detection frame of the smoke calibrated feature image based on the detection frame classification feature to obtain a detection frame classification result.

Specifically, in detection frame classification processing, the network feature of the last layer in the detection frame prediction processing is spliced with the detection frame prediction result to obtain the detection frame classification feature. Then the detection frame is input to the prediction network according to the detection frame classification feature. In the prediction network, those have the ability of predicting correct detection frames and the IOU between the prediction frame and the actual smoke frame being greater than 0.5 are taken as correct prediction. All prediction errors and confidence degrees that do not participate in the prediction are false. In addition, the frames with relatively small preset frames but participating in prediction, that is, prediction frames that are expected to have the lengths and widths being as close as possible to the corresponding true values, are also false. Thus, based on the confidence degree of the prediction frame, the detection frame of the smoke calibrated feature image is classified to obtain the detection frame classification result.

S64: the network feature of the last layer in the detection frame classification processing is spliced with the detection frame classification result to obtain an image classification feature, and image classification processing is performed on the smoke image in the smoke calibrated feature image based on the image classification feature and the confidence degree of the prediction frame to obtain the smoke image set.

Specifically, in image classification processing, the network feature of the last layer in the detection frame classification processing is spliced with the detection frame classification result to obtain the image classification feature. The image classification feature is subjected to maximum pooling treatment to obtain 1×1×C classification features, and in a full connection layer, the smoke image in the smoke calibrated feature image is classified based on the classification feature and the confidence degree of the prediction frame to obtain the smoke image set.

Then an output result related to the detection frame is post-processed, and the calculation formula of the union-intersection parameter is as follows:

$$IOU = \frac{A1 \cap A2}{A1 \cup A2}; SIOU = \frac{A1 \cap A2}{A1};$$

A1 represents the prediction frame with relatively high confidence degree, A2 represents the prediction frame with relatively low confidence degree, IOU calculation can be understood as the union-intersection ratio of two frames, and SIOU calculation refers to calculating the proportion of the union-intersection of two prediction frames in the prediction frames with relatively high confidence degree, and IOU and SIOU are taken as union-intersection parameters.

It should be noted that the smoke image set includes not only the image classification processing result, but also the segmentation processing result, a detection frame prediction processing result and a detection frame classification processing result.

S7: the smoke image set is screened based on the confidence degrees and the union-intersection parameters of the smoke features to obtain a target smoke image, and a smoke detection result is output based on the target smoke image.

Specifically, in the embodiment of the present application, all the prediction frames are sorted according to the confidence degrees, and then the IOU and SIOU of the prediction frames and other prediction frames with confidence degrees lower than their own confidence degrees are calculated from top to bottom. When IOU or SIOU is greater than the threshold value, the prediction frames with relatively low confidence degrees are deleted. Therefore, in the embodiment of the present application, the smoke image set is screened based on the confidence degrees and the union-intersection parameters of the smoke features to obtain the target smoke image, the smoke detection result is obtained according to whether smoke exists in the target smoke image, and the smoke detection result is output.

According to the embodiment of the present disclosure, the smoke image is generated through image enhancement processing and color transfer processing, so that the problem that the smoke data sets are difficult to obtain is solved; at the same time, according to the present application, feature extraction and layer calibration processing are further performed on the target image to generate the smoke calibrated feature image, and segmentation processing, detection frame prediction processing, detection frame classification processing and image classification processing are performed on the smoke calibrated feature image in sequence, that is, through layer calibration and multi-task processing, the problem that the local features and global features of smoke overlap due to the self-similarity of smoke image and the problem that smoke is easily mixed with background features due to the transparency of smoke itself are solved, and thus, the detection accuracy of smoke is improved.

Figure 8:
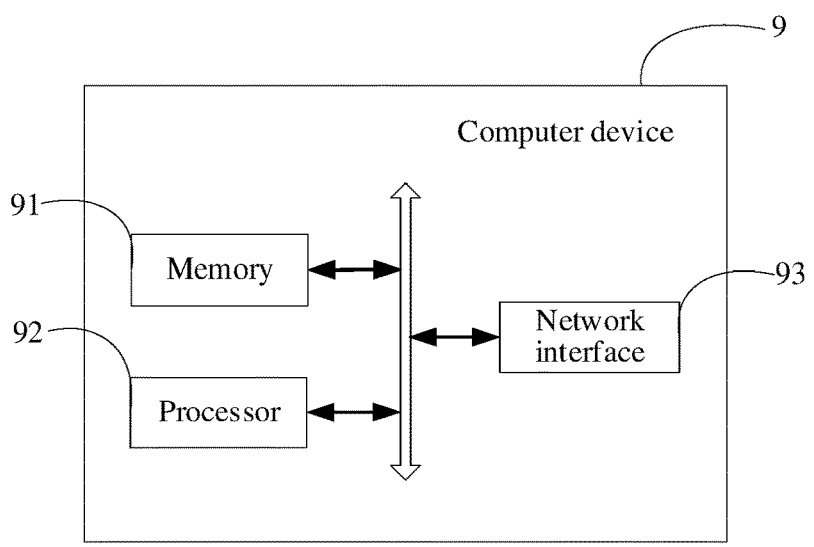
FIG. 8 is a schematic diagram of a computer device provided by an embodiment of the present application.

To solve the above technical problems, the embodiment of the present application further provides a computer device. Referring to FIG. 8, FIG. 8 is a basic structure diagram of a computer device of this embodiment.

A computer device 9 includes a memory 91, a processor 92, a network interface 93 which are in mutual communication connection through system buses. It should be noted that only the computer device 9 with three components that are the memory 91, the processor 92 and the network interface 93 is shown in the figure, but it should be understood that it is not required to implement all the components shown, and more or less components can be implemented instead. Those skilled in the art can understand that the computer device here is a device that can automatically perform numerical calculation and/or information processing according to preset or stored instructions; and hardware thereof includes, but is not limited to, a microprocessor, an application specific integrated circuit (ASIC), a field-programmable gate array (FPGA), a digital signal processor (DSP), an embedded device and the like.

The computer device may be a desktop computer, a notebook computer, a palmtop computer, a cloud server, and other computing devices. The computer device can interact with a user through a keyboard, a mouse, a remote control unit, a touch tablet or a voice control device.

The memory 91 at least includes one type of readable storage medium. The readable storage medium includes a flash memory, a hard disk, a multimedia card, a card type memory (such as SD or DX memory), a random access memory (RAM), a static random access memory (SRAM), a read only memory (ROM), an electrically erasable programmable read only memory (EEPROM), a programmable read only memory (PROM), a magnetic memory, a disc, an optical disc and the like. In some embodiments, the memory 91 may be an internal storage unit of the computer device 9, such as a hard disk or an internal storage of the computer device 9. In some other embodiments, the memory 91 may also be an external storage device of the computer device 9, such as a plug-in hard disk, a smart media card (SMC), a secure digital (SD) card, or a flash card that is equipped on the computer device 9. Of course, the memory 91 may also include both an internal storage unit and an external storage device of the computer device 9. In this embodiment, the memory 91 is generally configured to store an operating system and various application software installed in the computer device 9, such as program codes of the smoke detection method based on deep learning. In addition, the memory 91 may further be configured to temporarily store data that has been output or is about to be output.

In some embodiments, the processor 92 may be a central processing unit (CPU), a controller, a microcontroller, a microprocessor or other data processing chips. The processor 92 is generally configured to control the general operation of the computer device 9. In this embodiment, the processor 92 is configured to running program codes or processing data stored in the memory 91, such as the program codes for the above-mentioned smoke detection method based on deep learning, so as to realize various embodiments of the smoke detection method based on deep learning.

The network interface 93 may optionally include a wireless network interface or a wired network interface. The network interface 93 is generally configured to establish a communication connection between the computer device 9 and other electronic devices.

The present application further provides another implementation, that is, a computer readable storage medium is provided. The computer readable storage medium stores a computer program; and the computer program may be executed by at least one processor, so that the at least one processor executes the steps of the above-mentioned smoke detection method based on deep learning step.

According to the descriptions in the foregoing implementation, those skilled in the art may clearly learn that the method according to the above embodiment may be implemented by relying on software and a necessary general hardware platform, of course the method can also be implemented by hardware, but in many cases, the former is the better implementation. Based on such understanding, the technical solutions of the present application essentially, or the part contributing to the prior art, may be presented in the form of a software product. The computer software product is stored in a storage medium (for example, a ROM/RAM, a magnetic disk, or an optical disc), including several instructions to enable a terminal device (which may be a mobile phone, a computer, a server, an air conditioner, or a network device and the like) to perform the methods described in the embodiments of the present application.

What is claimed is:

1. A smoke detection method based on deep learning, comprising:
    acquiring a smoke image and an indoor image, wherein the smoke image comprises image transparency;
    determining a size and a position relationship of the smoke image in the indoor image, and performing image enhancement processing on the smoke image based on the size and the position relationship of the smoke image in the indoor image to obtain a basic smoke image;
    acquiring an illumination image of an indoor scene at a corresponding position of the basic smoke image, and performing color transfer processing on the basic smoke image based on the illumination image to obtain a color transferred smoke image;
    superimposing the color transferred smoke image on the indoor image based on the smoke transparency to obtain an initial image, and performing screening processing and detection frame updating processing on the initial image to obtain a target image;
    performing feature extraction on the target image through a multilayered network to obtain a smoke feature image, and performing layer calibration processing on the smoke feature image to obtain a smoke calibrated feature image;
    performing segmentation processing, detection frame prediction processing, detection frame classification processing and image classification processing on the smoke calibrated feature image in sequence according to a step-by-step feature learning mode to obtain a smoke image set, wherein the smoke image set comprises confidence degrees and union-intersection parameters of smoke features; and
    screening the smoke image set based on the confidence degrees and the union-intersection parameters of the smoke features to obtain a target smoke image, and outputting a smoke detection result based on the target smoke image.

2. The smoke detection method based on deep learning according to claim 1, wherein the acquiring a smoke image and an indoor image comprises:
    acquiring a smoke video, and returning the smoke video to a development terminal, so that the development terminal adds a detection frame label to the smoke video according to a preset frame rate to obtain a smoke detection frame;
    generating smoke data through preset smoke simulation software, and acquiring a target smoke video corresponding to the smoke data through a preset angle and a preset smoke flow rate; and
    generating the smoke image and the indoor image according to the smoke detection frame and the target smoke video.

3. The smoke detection method based on deep learning according to claim 1, wherein the determining a size and a position relationship of the smoke image in the indoor image, and performing image enhancement processing on the smoke image based on the size and the position relationship of the smoke image in the indoor image to obtain a basic smoke image comprises:

multiplying a preset parameter by the length and width of the indoor image to obtain a multiplication result, and changing the size of the smoke image based on the multiplication result to obtain a changed size of the smoke image;

comparing the changed size of the smoke image with the indoor image to confirm the size of the smoke image in the indoor image, and superimposing the position of the smoke image in the indoor image to confirm the position of the smoke image in the indoor image;

based on the size and the position relationship of the smoke image in the indoor image, taking a preset size of the smoke image as a radius of Gaussian function filtering;

performing filtering processing on the smoke image of each color channel according to the radius of Gaussian function filtering to obtain a filtering result, wherein the filtering result comprises calculation results of different color channels and different filtering scales; and weighting the calculation results of different filtering scales of the same color channel to obtain the basic smoke image.

4. The smoke detection method based on deep learning according to claim 1, wherein the acquiring an illumination image of an indoor scene at a corresponding position of the basic smoke image, and performing color transfer processing on the basic smoke image based on the illumination image to obtain a color transferred smoke image comprises:

acquiring the illumination image of the indoor scene at the corresponding position of the basic smoke image as a reference image;

performing color space conversion on the reference image and the basic smoke image respectively, and counting a mean value and a standard deviation of all color channels of the reference image and the basic smoke image;

subtracting the mean value of the basic smoke image from each pixel value in the basic smoke image to obtain a first processed image;

calculating a ratio of the standard deviation of the reference image to the standard deviation of the basic smoke image to obtain a standard deviation ratio, and multiplying the first processed image by the standard deviation ratio to obtain a second processed image; and adding a mean value of the second processed image and the mean value of the reference image to obtain the color transferred smoke image.

5. The smoke detection method based on deep learning according to claim 1, wherein the superimposing the color transferred smoke image on the indoor image based on the smoke transparency to obtain an initial image, and performing screening processing and detection frame updating processing on the initial image to obtain a target image comprises:

calculating a superimposition weight of the indoor image and the color transferred smoke image based on the smoke transparency;

according to the superimposition weight, superimposing the color transferred smoke image in the indoor image to obtain the initial image, wherein the initial image comprises a detection frame;

calculating transparency in the initial image, and performing screening processing on the initial image based on a comparison result between the transparency and a first preset threshold value to obtain a screening result; and calculating average transparency of the detection frame in the screening result, and performing updating processing on the detection frame based on a comparison result between the average transparency and a second preset threshold value to obtain the target image.

6. The smoke detection method based on deep learning according to claim 1, wherein the performing feature extraction on the target image through a multilayered network to obtain a smoke feature image, and performing layer calibration processing on the smoke feature image to obtain a smoke calibrated feature image comprises:

performing downsampling and convolution processing on the target image in sequence through each layer of the multilayered network to extract features of the target image, so as to obtain the smoke feature image;

dividing the smoke feature image into a large-size smoke feature image and a small-size smoke feature image according to the difference of scales;

performing channel segmentation and convolution processing on the large-size smoke feature image to obtain a first feature, performing channel compression processing and upsampling processing on the small-size smoke feature image to obtain a second feature, and performing feature addition on the first feature and the second feature to obtain a target feature; and activating the target feature by an activation function to obtain an activated feature, and performing point multiplication processing and splicing processing on the activated feature and the first feature to obtain the smoke calibrated feature image.

7. The smoke detection method based on deep learning according to claim 1, wherein the performing segmentation processing, detection frame prediction processing, detection frame classification processing and image classification processing on the smoke calibrated feature image in sequence according to a step-by-step feature learning mode to obtain a smoke image set comprises:

identifying the smoke features in the smoke calibrated feature image, segmenting the smoke features in the smoke calibrated feature image through the multilayered network to obtain an initial segmentation result, and performing activation processing and cross-entropy loss calculation processing on the initial segmentation result to obtain a target segmentation result;

splicing a network feature of the last layer in the multilayered network with a detection frame feature to obtain a target detection frame feature, and performing detection frame prediction processing and prediction frame loss calculation processing on a detection frame in the smoke calibrated feature image based on the target detection frame feature to obtain a detection frame prediction result, wherein the detection frame prediction result comprises a confidence degree of a prediction frame;

splicing the network feature of the last layer in the detection frame prediction processing with the detection frame prediction result to obtain a detection frame classification feature, and performing detection frame classification processing on the detection frame of the smoke calibrated feature image based on the detection frame classification feature to obtain a detection frame classification result; and splicing the network feature of the last layer in the detection frame classification processing with the detection frame classification result to obtain an image classification feature, and performing image classification processing on the smoke image in the smoke calibrated feature image based on the image classification feature and the confidence degree of the prediction frame to obtain the smoke image set.

8. A computer device, comprising a memory and a processor, wherein the memory stores a computer program, and the processor executes the computer program to implement the smoke detection method based on deep learning according to claim 1.

9. A non-transitory computer readable storage medium, having a computer program stored thereon, wherein the computer program is executed by a processor to implement the smoke detection method based on deep learning according to claim 1.

* * * * *